US011231178B2

(12) United States Patent
James (10) Patent No.: US 11,231,178 B2
(45) Date of Patent: Jan. 25, 2022

(54) REMOVABLE BURN POT

(71) Applicant: Dansons US, LLC, Phoenix, AZ (US)

(72) Inventor: Chris James, Phoenix, AZ (US)

(73) Assignee: Dansons US, LLC, Scottsdale, AZ (US)

( * ) Notice: Subject to any disclaimer, the term of this patent is extended or adjusted under 35 U.S.C. 154(b) by 71 days.

(21) Appl. No.: 16/710,490

(22) Filed: Dec. 11, 2019

(65) Prior Publication Data
US 2021/0180793 A1 Jun. 17, 2021

(51) Int. Cl.
| | | |
|---|---|---|
| *F24B 13/00* | (2006.01) |
| *A47J 37/07* | (2006.01) |
| *F24B 13/02* | (2006.01) |
| *F24B 13/04* | (2006.01) |

(52) U.S. Cl.
CPC ......... *F24B 13/006* (2013.01); *A47J 37/0704* (2013.01); *A47J 37/0786* (2013.01); *F24B 13/02* (2013.01); *F24B 13/04* (2013.01)

(58) Field of Classification Search
CPC ............... A47J 31/0626; A47J 31/0663; A47J 31/0684; A47J 31/3666; A47J 31/3685; A47J 31/4407; A47J 31/4467; F24C 15/162; F24C 15/02; A47B 2021/0321; A47B 21/0314; A47B 21/0371; A47B 96/021
See application file for complete search history.

(56) References Cited

U.S. PATENT DOCUMENTS

| | | | | |
|---|---|---|---|---|
| 3,087,771 A | * | 4/1963 | Pari ...................... | A47B 88/467 312/332 |
| 4,823,684 A | | 4/1989 | Traeger et al. | |
| 6,223,737 B1 | * | 5/2001 | Buckner ............ | A47J 37/0704 126/25 R |
| 10,201,247 B1 | * | 2/2019 | Jones ...................... | A47J 37/07 |
| 2015/0316268 A1 | * | 11/2015 | Mackle ..................... | F23B 1/38 110/267 |
| 2018/0156465 A1 | * | 6/2018 | Oviatt ................... | F24B 13/004 |

(Continued)

FOREIGN PATENT DOCUMENTS

| | | |
|---|---|---|
| AU | 2018100988 | 8/2018 |
| CN | 202625112 U * | 12/2012 |
| CN | 207432177 U * | 6/2018 |

(Continued)

OTHER PUBLICATIONS

Australian Examination Report No. 1 for Application No. 2020273350 dated Jun. 11, 2021, 7 pages.

(Continued)

*Primary Examiner* — Jason Lau
(74) *Attorney, Agent, or Firm* — Seyfarth Shaw LLP (57) ABSTRACT

The presently disclosed embodiments include a burner assembly for a cooking appliance that features a pullout including a removable burn pot. The pullout allows a user to easily remove the burn pot to empty burned ash and clean any residual materials from the burn pot. The pullout features a keyway design to aid in retention and easy removal from a cooking appliance. The pullout couples to a fuel chamber that houses an auger for supplying a fuel source and an ignitor. The pullout includes a gasket that provides a sealing engagement between the pullout and the cooking appliance.

10 Claims, 7 Drawing Sheets

(56) References Cited

U.S. PATENT DOCUMENTS

2018/0317707 A1 11/2018 Dahle
2020/0240643 A1* 7/2020 Donnelly .............. H04L 67/125

FOREIGN PATENT DOCUMENTS

| WO | 0123808 | 4/2001 |
| WO | 2016138577 | 9/2016 |
| WO | 2018208919 | 11/2018 |

OTHER PUBLICATIONS

Australian Examination Report No. 2 for Application No. 2020273350, dated Oct. 8, 2021, 3 pages.

* cited by examiner

FIG. 7

REMOVABLE BURN POT

TECHNICAL FIELD OF INVENTION

The presently disclosed embodiments relate generally to grills and smokers. More particularly, the presently disclosed embodiments relate to a cooking appliance with a removable burn pot.

BACKGROUND OF THE INVENTION

Smokers are a common outdoor cooking appliance that burn fuel at a low temperature to cause smoke to flow into a cook chamber. The smoke not only cooks the meat within the cook chamber but also provides flavor during the cooking process. Similarly, grills can use a similar process to burn fuel, typically at higher temperatures, to provide a flavor to the food that is difficult to obtain using a conventional indoor cooking appliance.

Pellet grills and smokers are common types of appliances used for cooking meat or other food. These appliances burn pellets of wood based on a temperature of the cook chamber. A user can operate a controller to set the temperature of the cook chamber and the appliance will then burn pellets until the temperature is reached. Thereafter, the appliance will sense that the desired temperature has been reached and will temporarily halt the supply of pellets to avoid heating above the desired temperature, similar to a thermostat system. When the temperature in the cook chamber is detected below the set temperature, a supply of pellets may be introduced and burned to increase the temperature.

Pellet grills and smokers typically include a burner assembly that combusts the pellets to provide the necessary heat and smoke to the food in the pellet grill. The burner assembly typically features a burn pot where the pellets, or other fuel source, are ignited and burned to provide the smoke and heat used to cook the food. Traditional burn pots however, collect a significant amount of ash and other residue from the burning of the pellets. If an ash-laden burn pot is exposed to water the burn pot may become even more difficult to empty and clean. The burn pot must be frequently cleaned to avoid an appliance malfunction or poor burn performance.

SUMMARY OF THE INVENTION

The present disclosure provides for a cooking appliance with a pullout assembly including a removable burn pot. According to one embodiment a cooking appliance may include a body defining at least one recess, a hopper configured to hold a fuel source and a fuel chamber coupled to the hopper. A pullout may include a burn pot and a plate. The pullout may be removably coupled to the recess of the body. The burn pot may also removably engage the fuel chamber.

According to another embodiment, a pullout assembly for a cooking appliance is disclosed. The pullout assembly may include a handle, a plate coupled to the handle, and a burn pot coupled to the plate. The burn pot may include at least one keyway surface configured to retain a coupling of the pullout assembly to the cooking appliance.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments include a burner assembly for a cooking appliance that features a pullout including a removable burn pot. The pullout allows a user to easily remove the burn pot to empty burned ash and clean any residual materials from the burn pot. A clean burn pot is advantageous to a cooking operation and longevity of the appliance due to the required airflow in and through the combustion area where the fuel source is burned. Build-up of ash and other residues can hinder not only the effective and efficient operation of the cooking appliance, but also the flavor of the food being cooked.

Figure 1:
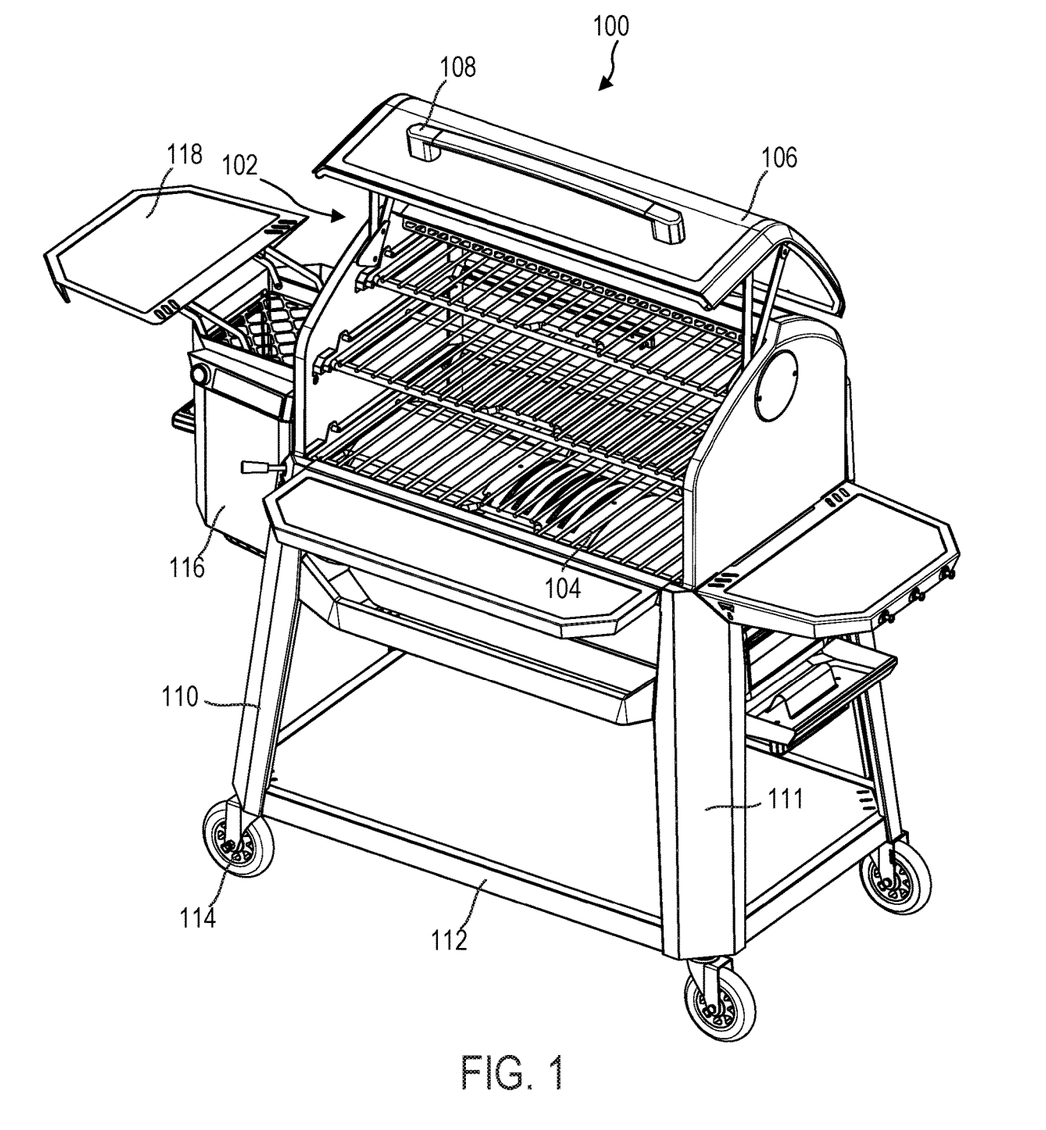
FIG. 1 is front perspective view of an appliance according to at least some of the presently disclosed embodiments.
Figure 2:
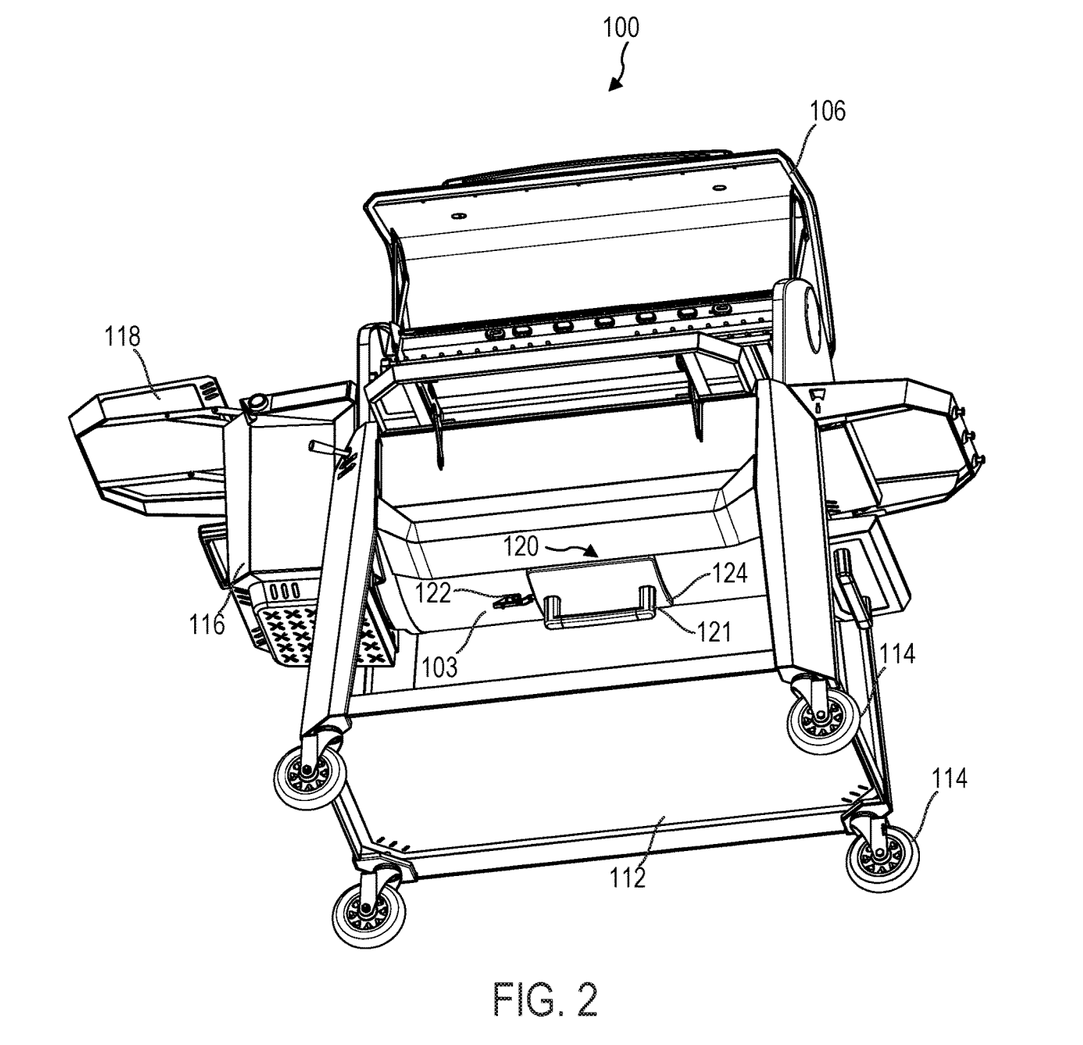
FIG. 2 is a bottom perspective view of an appliance according to at least some of the presently disclosed embodiments.

FIGS. 1-2 depict a cooking appliance 100, such as a smoker or grill, according to at least one embodiment. The appliance 100 may include or define a cooking chamber 102 configured to hold or support one or more racks 104. Food may be placed on the racks 104 during cooking. The cooking chamber 102 may be closed or covered by a hinged cover 106 that may include a handle 121 to allow a user to open the cover 106 and access the cooking chamber 102. The cooking chamber 102 may be fluidly coupled to a burner assembly (not shown) where smoke and heat are generated. The cooking chamber 102 may be supported by, or be part of a frame 110. The frame 110 may include one or more supporting legs 111, one or more storage shelves 112, and one or more wheels 114 making the cooking appliance 100 moveable or portable. A hopper 116 may be disposed adjacent to or behind the cooking chamber 102, for example. The hopper 116 may be configured to retain and store a fuel source, such as wood pellets, to be burned or otherwise combusted in a burner assembly (not shown) to provide heat to the cooking chamber 102. The hopper 116 may include a removable lid 118 to protect the fuel source from the outside environment. The underside of the cooking chamber 102 may include a pullout 120 (FIG. 2) coupled to the burner assembly and burn pot (not shown) for easy removal and cleaning. The pullout 120 may include a handle 121 and plate 124 that provides a sealing engagement with the underside of the cooking chamber 102. The pullout 120 may be coupled to a retention device 122, such as a hinge, lever, lock or other device that may allow the pullout 120 to hang or otherwise remain removably coupled to the underside of the appliance 100 when the pullout 120 is removed from the underside of the cooking appliance 100.

Figure 3:
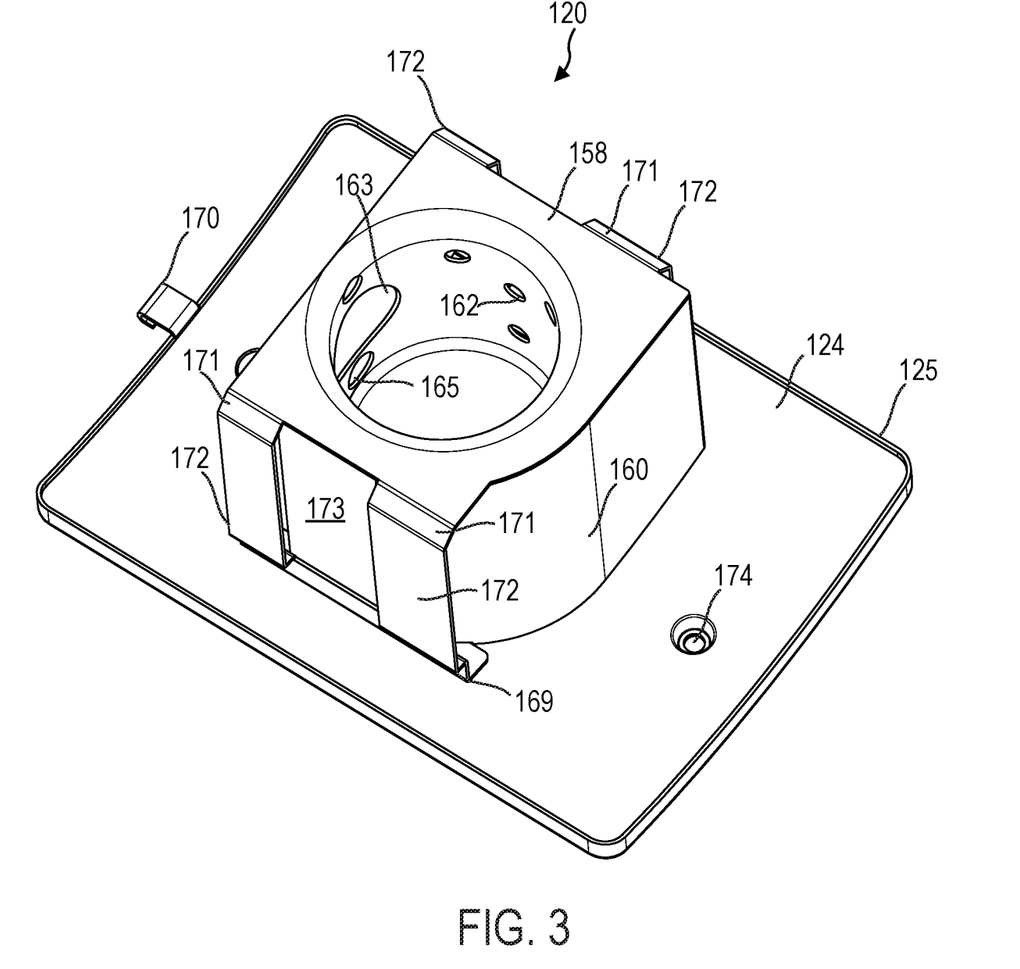
FIG. 3 is a top perspective view of a removable burn pot according to at least some of the presently disclosed embodiments.
Figure 4:
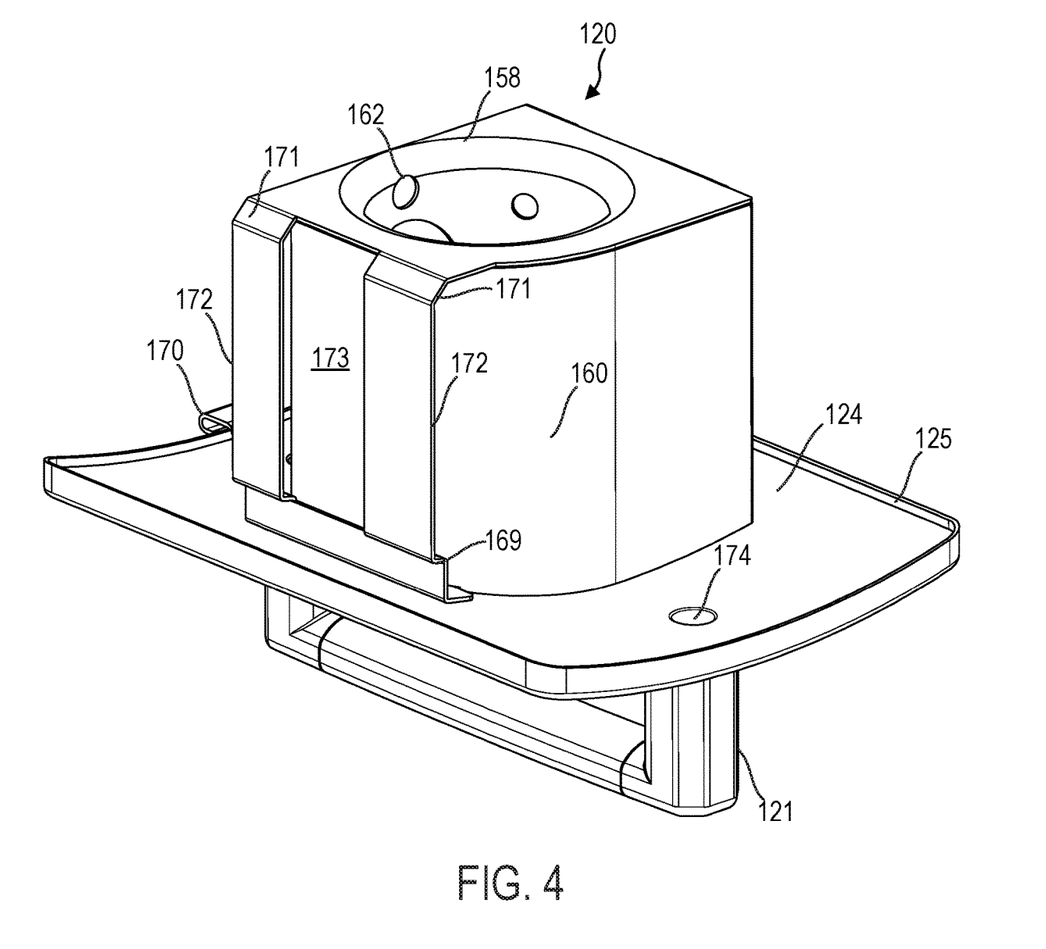
FIG. 4 is a side perspective view of a removable burn pot according to at least some of the presently disclosed embodiments.

FIGS. 3-4 depict a pullout 120 according to at least one embodiment of the present disclosure. Generally, the pullout 120 may include or be formed of a burn pot 158, a plate 124, and a handle 121. The burn pot 158 may include or define one or more vents 162 in the sidewalls sized and shaped to allow the flow of air into and out of the burn pot 158. The burn pot 158 may include or define an inlet 163 configured to receive an auger (not shown) feeding a fuel source to the burn pot 158. The burn pot 158 may further include or define an ignitor hole 165 configured to receive an ignitor or other combustion-inducing device. As described herein, the pullout 120, and more particularly the burn pot 158 may be configured to couple to a fuel chamber as part of a burner assembly in the cooking appliance 100. According to one aspect, the burn pot 158 may include a shrouded surface 160. The shrouded surface 160 may be a curved sidewall without any vents and configured to direct the flow of air through the burn pot 158 and out one or more outlet vents.

The pullout 120 can include a keyway engagement configured to ensure a secure an accurate engagement of the pullout 120 with the cooking appliance 100 when installed. As part of the keyway engagement, the pullout 120 may form or include, for example as part of the exterior of the burn pot 158, one or more keyway surfaces 172 adjacent to one or more recessed surfaces 173. The keyway surfaces 172 may be flexible or spring-like to enhance the fitting engagement with the appliance body 103, as described below. For example, the keyway surfaces 172 may include a flexible coupling to the burn pot 158 that allows the keyway surfaces 172 to flex or bend inward as the pullout 120 is removed or installed. The keyway surfaces 172 may include chamfers 171, fillets, bevels, or the like, configured to reduce friction when reinstalling the pullout 120 into the appliance body 103. The burn pot 158 may also feature or define a flange 169 on or about the keyway surfaces 172 and the recessed surfaces 173. The flange 169 may be positioned to abut the inner surface of the appliance body 103 providing a frictional resistance to keep the pullout 120 in place.

Figure 5:
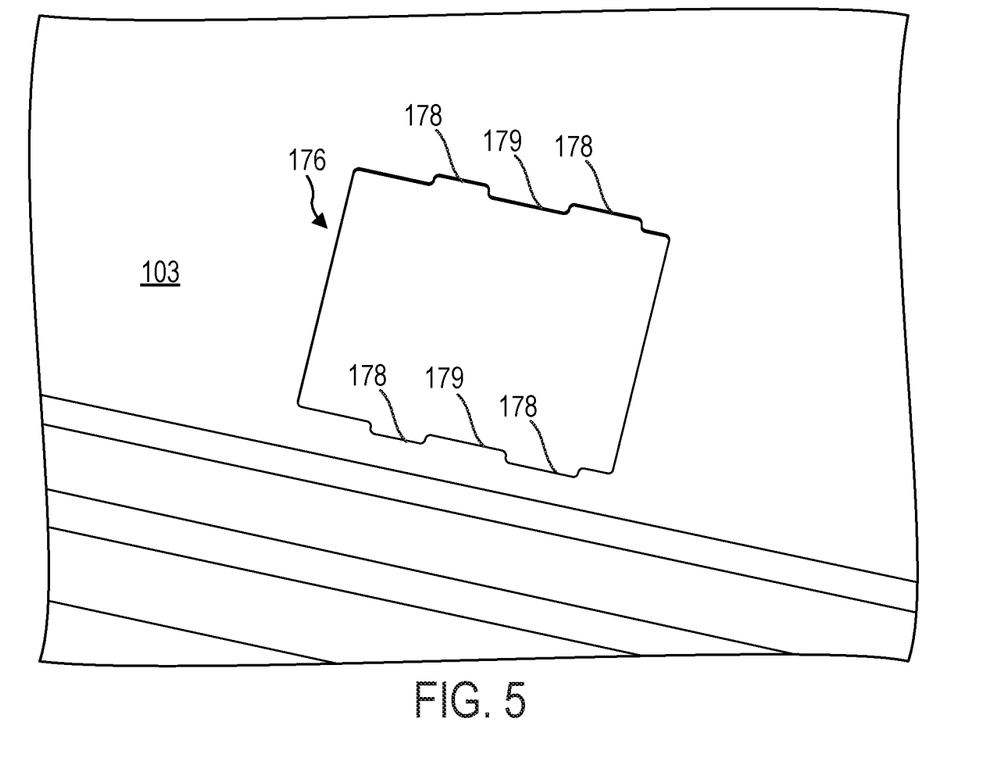
FIG. 5 is a partial bottom view of a cooking appliance according to at least some of the presently disclosed embodiments.

FIG. 5 depicts the outer surface of the appliance body 103 with the pullout 120 removed. The keyway engagement may include or define a recess 176 in the appliance body 103 sized and shaped to receive the pullout 120 in a fitting and secure engagement. The recess 176 may include or define one or more tabs 179 configured to engage the keyway surfaces 172 of the burn pot 158. The tabs 179 may be adjacent to one or more notches 178. During installation or removal of the pullout 120, the keyway surfaces 172 may flex against the tabs 179 to slide the burn pot 158 through the recess 176 with some resistive friction. When installed, the tabs 179 may abut the flange 169, further retaining the pullout 120 in place.

Returning to FIGS. 3-4, the pullout 120 may further include a plate 124 supporting the burn pot 158. The plate 124 may be shaped to match the outer surface of the appliance body 103, for example with an arc matching that of the underside of the appliance body 103. The plate 124 may include a gasket 125 about the perimeter of the plate 124. The gasket 125 may be sized and shaped to form a fitting seal against the outer surface of the appliance body 103 when the pullout 120 is installed. A hook 170 or other retention device may be coupled to or formed by the plate 124. The hook 170 may be configured to engage with the retention device 122 disposed on the outer surface of the appliance body 103. The pullout 120 may further include a handle 121 coupled to the plate 124 by one or more fasteners 174. The handle 121 may be configured to provide one-handed removal and installation by a user.

Figure 6:
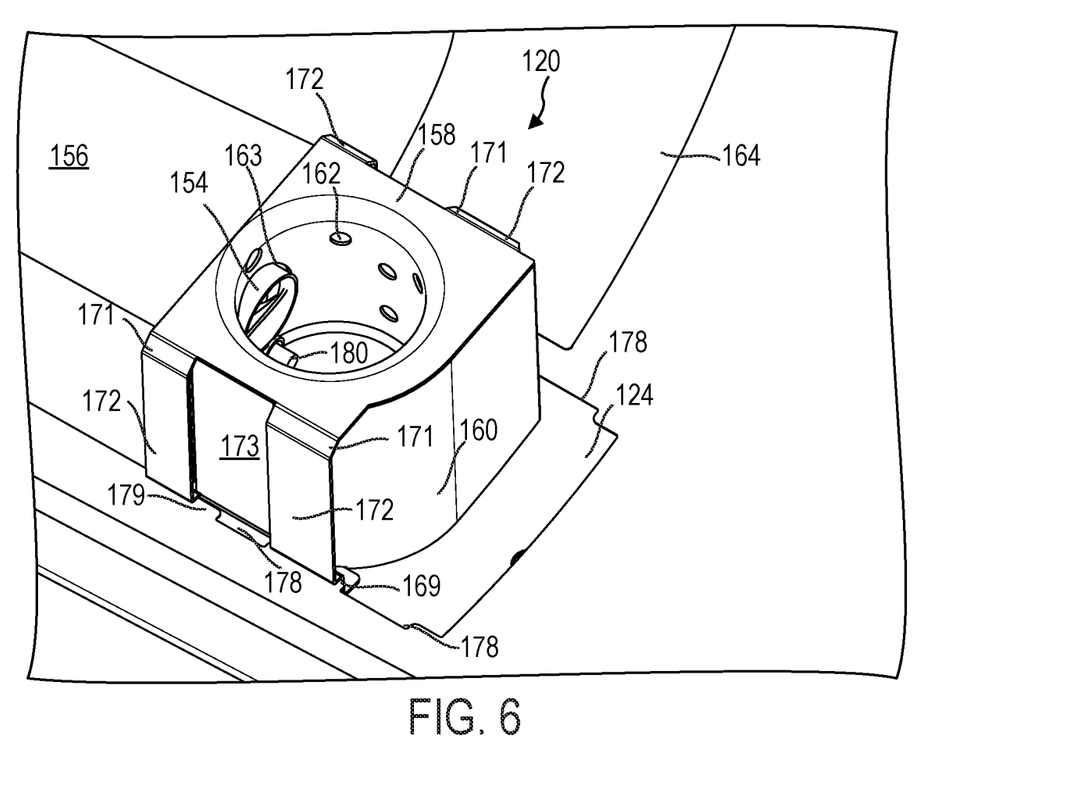
FIG. 6 is a partial top perspective view of a burn pot installed in a cooking appliance according to at least some of the presently disclosed embodiments.

FIG. 6 depicts an internal view of the cooking appliance 100 with the pullout 120 installed. The burn pot 158, when the pullout 120 is installed, may be coupled to a fuel chamber 156 that houses an auger 154 configured to rotationally drive a fuel source, such as wood pellets, into the burn pot 158 through the inlet 163. An ignitor 180 may extend through the ignitor hole 165. The plate 124 of the pullout 120 may form a sealing engagement against the outer surface of the appliance body 103 with the assistance of the keyway surfaces 172, recessed surfaces 173, notches 178 and tabs 179. The flange 169 may abut the notches 178 of the surface of the appliance body 103 providing additional resistance to the pullout 120 and preventing the pullout 120 from falling out of the cooking appliance 100. According to one embodiment, a deflector plate 164 may be disposed adjacent to the burn pot 158 to aid in directing airflow of smoke and heat from the burn pot 158 to the cooking chamber 102.

Figure 7:
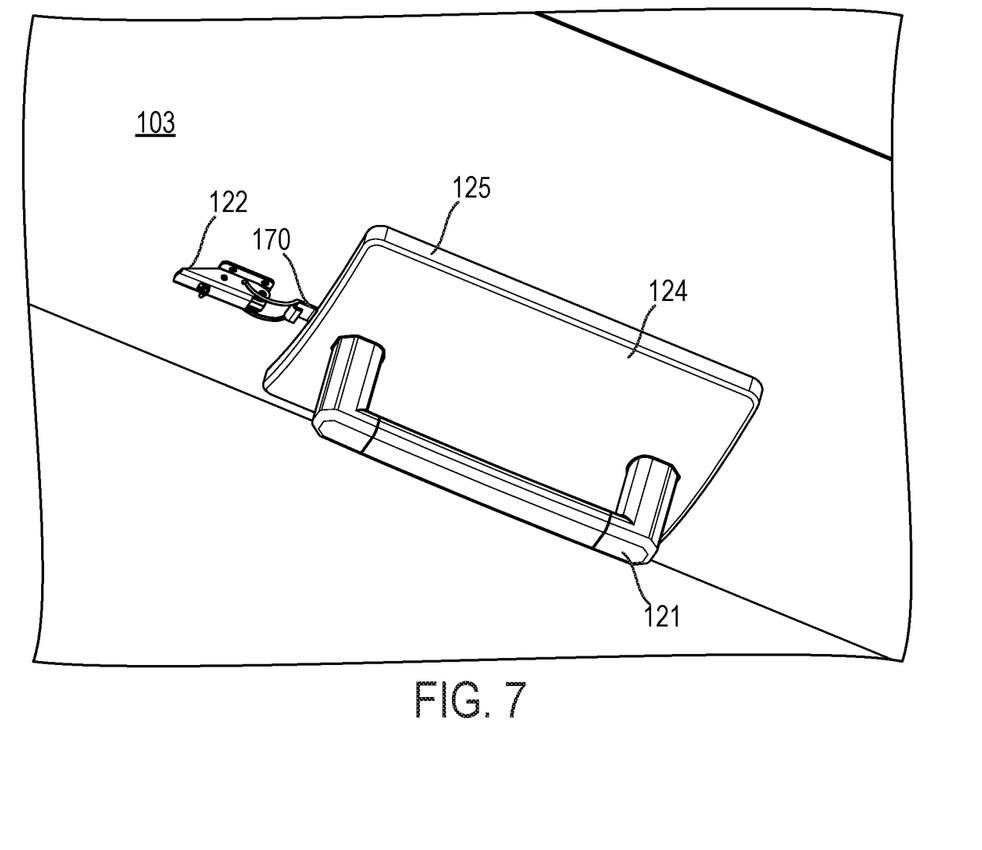
FIG. 7 is a bottom perspective view of a cooking appliance with a burn pot installed according to at least some of the presently disclosed embodiments.

FIG. 7 depicts the underside of the cooking appliance 100 with the pullout 120 installed. The plate 124 may form a sealing engagement with the appliance body 103. The hook 170 may be coupled to the retention device 122 via a wire, filament, string, rope, or the like, such that when the pullout 120 is removed from the cooking appliance 100, by a user pulling downward on the handle 121, the pullout 120 may hang from the retention device 122. Such an arrangement may allow the user to dump the ash from the burn pot 158 without having to disconnect fully the pullout 120 from the appliance 100. Should the burn pot 158 or pullout 120 require additional care, the hook 170 may be disengaged from the hinge and the pullout 120 may be removed and disconnected from the appliance 100 with ease.

As used herein, the terms "grill" or "smoker" are intended to be construed broadly as including any outdoor cooking appliance 100 that uses heat. For example, a "grill" or "smoker" according to the present invention can include a grill, smoker, griddle, burner, wood stove, outdoor heater, or any other outdoor cooking appliance 100 that uses heat.

Although embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A cooking appliance comprising:
   a body defining at least one recess;
   a hopper configured to hold a fuel source;
   a fuel chamber coupled to the hopper;
   a pullout comprising at least one keyway surface, at least one recessed surface adjacent to the at least one keyway surface, a burn pot, and a plate, the pullout removably coupled to the recess of the body, and the burn pot removably engaging the fuel chamber,
   wherein the at least one keyway surface corresponds to at least one notch defined in the recess of the body, and the at least one recessed surface is sized and shaped to match a corresponding tab defined in the recess of the body; and
   wherein the at least one keyway surface comprises a flexible coupling to pullout.

2. The cooking appliance of claim 1, wherein the plate is shaped to match an exterior shape of the body.

3. The cooking appliance of claim 1, wherein the pullout comprises a gasket coupled to a perimeter of the plate, the gasket forming a sealing engagement with the body.

4. The cooking appliance of claim 1, further comprising a retention device coupled to the body, the pullout including a hook configured to couple to the retention device.

5. The cooking appliance of claim 1, wherein the pullout comprises at least one keyway surface, the at least one keyway surface corresponding to at least one notch defined in the recess of the body.

6. The cooking appliance of claim 5, wherein the pullout comprises at least one recessed surface adjacent to the at least one keyway surface, the at least one recessed surface sized and shaped to match a corresponding tab defined in the recess of the body.

7. The cooking appliance of claim 5, wherein the at least one keyway surface defines a flange, the flange configured to abut an interior surface of the body.

8. The cooking appliance of claim 1, wherein the burn pot defines an inlet configured to receive an auger, the auger configured to drive the fuel source from the hopper to the burn pot.

9. The cooking appliance of claim 1, wherein the burn pot defines at least one vent.

10. The cooking appliance of claim 1, wherein the flexible coupling comprises a chamfer.

* * * * *